Figure 1:
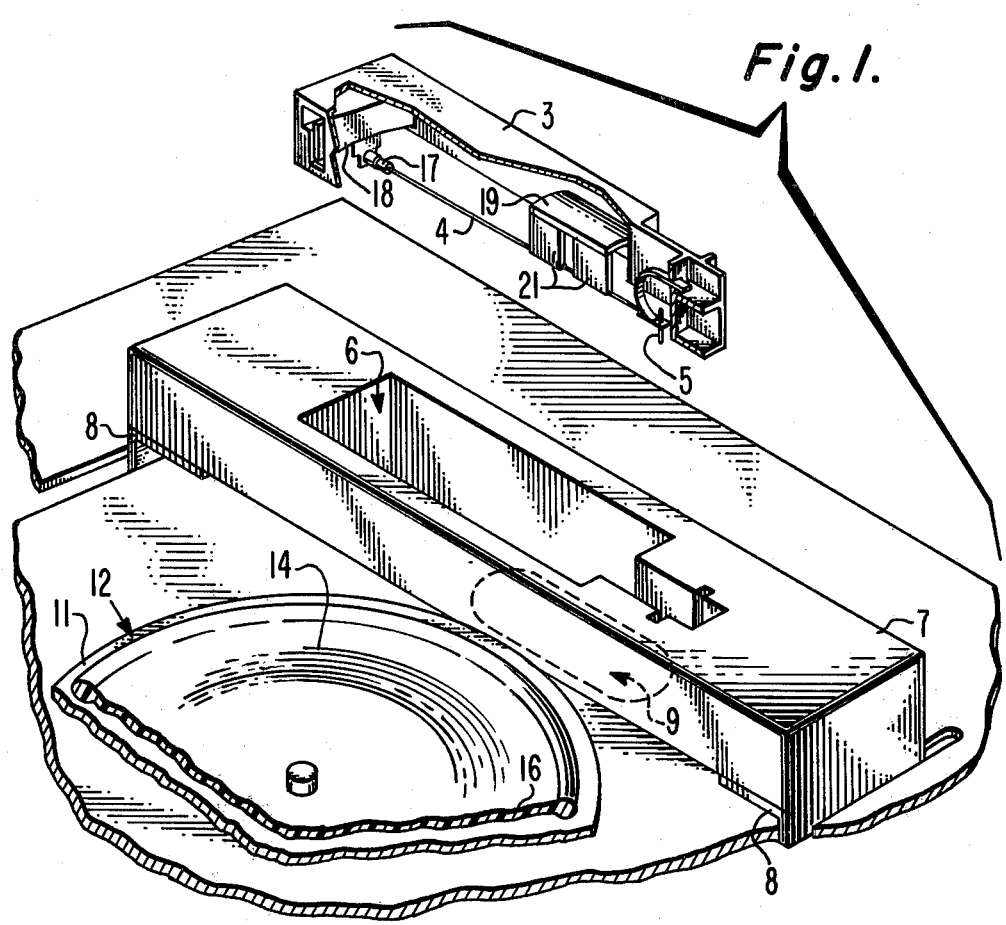

United States Patent [19]

Toda et al.

[11] 4,176,378
[45] Nov. 27, 1979

[54] SIGNAL PICKUP ARM LIFTING/LOWERING AND GROOVE SKIPPER APPARATUS

[75] Inventors: Minoru Toda; Susumu Osaka, both of Machida; Yasushi Matsumoto, Narashino, all of Japan

[73] Assignee: RCA Corporation, New York, N.Y.

[21] Appl. No.: 895,972

[22] Filed: Apr. 13, 1978

[30] Foreign Application Priority Data

Apr. 19, 1977 [GB] United Kingdom ............... 16280/77

[51] Int. Cl.² .................... H04N 5/76; G11B 3/38; G11B 17/00
[52] U.S. Cl. ..................... 358/128; 179/100.4 D; 179/100.41 D; 274/23 A; 360/10
[58] Field of Search ............. 360/10, 11, 36, 77, 360/78; 358/128; 179/100.4 V, 100.4 ST, 100.41 K, 100.41 P, 100.41 G, 100.41 J, 100.41 D; 274/23 A

[56] References Cited

U.S. PATENT DOCUMENTS

| | | | |
|---|---|---|---|
| 3,247,404 | 4/1966 | Batsch | 179/100.41 P |
| 3,842,194 | 10/1974 | Clemens | 358/128 |
| 3,993,863 | 11/1976 | Leedom et al. | 179/100.4 D |
| 4,049,280 | 9/1977 | Leedom | 358/128 X |
| 4,053,161 | 10/1977 | Bleazey et al. | 274/23 A |
| 4,059,277 | 11/1977 | DeStephanis | 274/23 A |

*Primary Examiner*—Bernard Konick
*Assistant Examiner*—Donald McElheny, Jr.
*Attorney, Agent, or Firm*—E. M. Whitacre; J. S. Tripoli; D. A. Kulkarni

[57] ABSTRACT

A pickup arm pivotally coupled to a housing support at one end thereof, remote from a stylus carrying end, is also coupled to the housing near its other end by means of bimorph elements attached together at right angles. The bimorph elements are arranged such as to enable, upon proper actuation of the bimorphs, pickup arm movement in two orthogonal directions. With the housing mounted in a disc record player, over a turntable of the player, the bimorphs effect a lifting/lowering in addition to a lateral motion of the pickup arm relative to the turntable.

5 Claims, 2 Drawing Figures

SIGNAL PICKUP ARM LIFTING/LOWERING AND GROOVE SKIPPER APPARATUS

The present invention relates to disc record player pickup arm systems, and more particularly relates to an apparatus for effecting both a smooth landing of a delicate signal pickup stylus on a disc record disposed on a turntable of the player and lateral shifting of the signal pickup stylus from one groove to another groove.

In certain video disc systems, video information is recorded by means of geometric variations in the bottom of a smooth spiral groove on the surface of a disc record. The disc record surface includes a coating of conductive material which is preferably covered with a thin deposit of dielectric material. A signal pickup, supported at one end of a pickup arm and tapered to a tip, engages the spiral groove and includes a conductive electrode which establishes a capacitance with the conductive coating and the dielectric deposit of the disc record. When the disc record is rotated, the electrode-disc capacitance varies in response to the geometric variations in the bottom of the spiral groove passing beneath the signal pickup. The capacitance variations are converted to electrical signal variations by suitable signal processing circuitry coupled to the pickup electrode. The output signal of the signal processing circuitry may be coupled to a conventional television receiver for reproduction. The pickup arm is mounted on a signal pickup housing of the playback system. A system of the aforementioned type is described in U.S. Pat. No. 3,842,194, to Jon K. Clemens.

In the playback systems of the aforementioned type, it is desirable to effect a smooth pickup arm lifting/lowering function whereby landing of the signal pickup on the disc record disposed on the turntable is accomplished without damage to either the signal pickup or the record for the following illustrative reasons. First, the disc record has fragile grooves (e.g., groove spacing 3.5 microns). Second, the signal pickup is delicate (e.g., the signal pickup electrode depth is typically 0.2 microns and the signal pickup electrode width is typically 2.0 microns). Third, the disc record is rotated at a relatively high speed (e.g., 450 rpm). Fourth, the signal pickup electrode dimensions are critical due to a relatively high frequency video recording in the disc record grooves (e.g., 4 megacycles).

Further, it is desirable to provide a signal pickup lowering apparatus (1) which is relatively simple and rugged in construction, (2) which will provide a repeatable control of the signal pickup landing on the disc record, and (3) which will be suitable for relatively inexpensive mass manufacturing techniques.

Additionally, in certain particular applications of a video disc system, it may be desirable to provide certain features such as stop motion of the displayed image. That is, to repetitively provide output signals of basically the same displayed image on an associated television monitor. A further desirable feature for incorporation with a video disc player is the ability to provide rapid forward motion or reverse motion of the displayed image. Additionally, it will be appreciated that disc records having high groove densities may be subject to an occasional flaw causing the spiral groove to prematurely terminate. Such premature termination, referred to as a locked groove, may result in an undesired repetition of a groove convolution during record playback. It is therefore desirable to incorporate in a video disc player apparatus suitable for repositioning the signal pickup stylus of a locked groove.

In the prior art (e.g., U.S. Pat. No. 3,993,863—M. A. Leedom, et al.), apparatus for repositioning a signal pickup stylus from one convolution on a spiral groove disc record to another convolution has been disclosed to comprise means coupled to the stylus for supporting the stylus in relationship with the spiral groove. Positioning means are interposed between the stylus and the support means for providing lateral motion to the stylus with respect to the support means. Control means are coupled to the positioning means and provide signals to control the amplitude and direction of lateral movement of the positioning means.

In accordance with the present invention, the aforesaid implementation of the groove-shifting and pickup arm lifting/lowering functions are advantageously implemented by means of a single, simple and reliable apparatus. Illustratively, a pickup arm pivotally coupled to a housing support at one end thereof, remote from a stylus carrying end, is also coupled to the housing near its other end by means of bimorph elements attached together at right angles. The bimorph elements are arranged such as to enable, upon proper actuation of the bimorphs, pickup arm movement in two orthogonal directions. With the housing mounted over the player turntable, the bimorphs effect a lifting/lowering in addition to a lateral motion of the pickup arm relative to the turntable.

Figure 2:
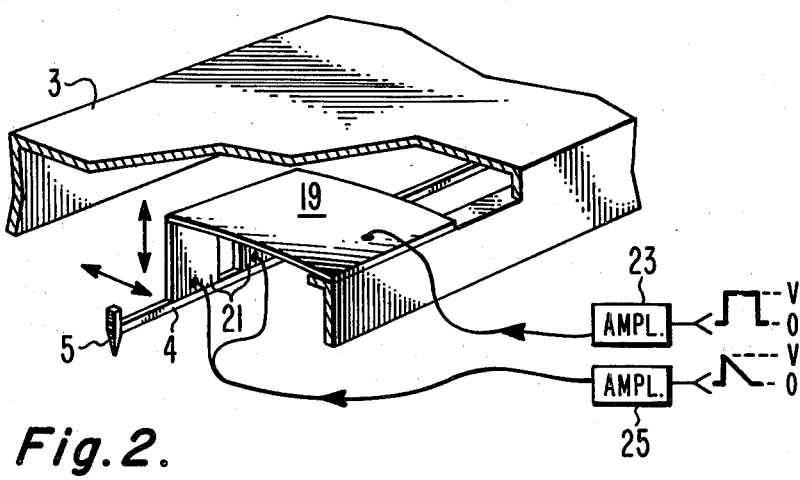

In the accompanying drawings:

FIG. 1 is a perspective view of a video disc record player incorporating a preferred embodiment of a signal pickup lifting lowering apparatus pursuant to the present invention; and FIG. 2 is an enlarged perspective view of the stylus arm assembly of the embodiment of FIG. 1.

With reference to FIG. 1, a video disc playback system includes a housing support in the form of cartridge 3 enclosing a pickup arm 4, the free end of which supports a stylus 5. The cartridge 3 is received in a compartment 6 of a box-like carriage 7 which is mounted to a support member 8 for movement between an off-turntable standby position and an above-turntable playback position. During playback, the pickup arm 4 passes through an opening 9 in a bottom wall of the carriage 7. Support member 8 is driven by a radial drive feed mechanism illustratively of a type described in U.S. Pat. No. 3,870,835, to F. R. Stave. Details of the cartridge 3 are described in U.S. Pat. No. 4,049,280, to Marvin Leedom.

The player system further includes a turntable 11 supporting a video disc record 12 of a type having video information recorded by means of geometrical variations (not shown) in a spiral groove 14 on the surface thereof. The record 12, illustratively of a type shown in the aforementioned Clemens patent, includes a thin coat of dielectric material covering a conductive material which is disposed on the grooved surface of the disc (e.g., only a dielectric substrate 16 being shown).

With reference to FIGS. 1 and 2, the stylus arm 4 is attached at one end thereof, remote from the stylus carrying end, by means of a compliant support 17 and a connector plate 18, which permits pivotal motion of the arm 4. The pickup arm 4 is also attached, near its stylus carrying end, to housing support 3 by means of bimorph elements 19 and 21. Piezoelectric, bimorph element 19 (lifter/lowerer bimorph) is fastened to the housing support 3 in a manner permitting it to laterally project from one of the sidewalls of the housing support, which are vertically positioned relative to turntable 11. A pair of piezoelectric bimorph elements 21 (skipper bimorphs) are affixed at one end to lifter/lowerer bimorph 19 at right angles therefore. Skipper bimorphs 21 are attached at their other ends to the stylus arm 4 substantially as shown in FIG. 2. Wires are fastened to metal layers of each of bimorph elements 19 and 21 for providing electrical connections to these elements.

Bimorph elements 19 and 21, are illustratively, comprised of an alternating series of layers of metal and piezoelectric material such as polyvinylidene fluoride. Details of their construction are explained in the aforesaid U.S. Pat. No. 3,993,863 and will therefore not be repeated here. However, it will be appreciated that upon application of an appropriate potential across the metal layers of a bimorph element, contraction and expansion of piezoelectric layers thereof cause the entire bimorph element to bend, when one end of the element is secured, in a direction dictated by the polarity of the applied potential.

It will be appreciated that when lifter/lowerer bimorph 19 is not electrically activated it assumes a depressed position which permits the stylus arm to occupy a lowered position. The lowered position of the stylus arm establishes stylus/record contact when the stylus housing supports are in an above-record play position. Further, the angle between the compliant member 17 and the connector plate 18, during containment of the housing support 3 in the carriage 7, is such that when the stylus arm 4 is in the lowered position, the compliant member is aligned with the stylus arm (and hence the compliant member is unstressed).

In the system of the present invention, the stylus 5 usually follows the shift of the groove 14 formed in the record disc 12. The lifter/lowerer bimorph 19, which comprises a relatively thick film, does not limit the motion of the stylus 5 during normal operation, since any relative motion between stylus 5 and lifter/lowerer bimorph 19 is easily enabled by the bending of skipper bimorphs 21.

When the housing support 3 moves from an off-record rest position to one of above-record playback positions, the lifter/lowerer bimorph 19 is energized by the output of an amplifier 23 which provides a dc bias to effect bending of the bimorph 19 in a direction to lift the stylus arm 4 to an elevated position allowing the stylus 5 to clear the outer bead of the record 12. Thereafter, with the housing support 3 in the above record position, the supply of potential to the bimorph 19 is ceased whereby the bimorph assumes its normal depressed position which permits the stylus arm 4 to occupy the lowered position.

With the stylus arm 4 occupying the lowered position, and the carriage 7 in the above-record position, the stylus 5 protrudes through the opening 9 thereby establishing stylus/record contact and the stylus 5 rides in the groove 14. When the stylus 5 has to be driven suddenly to another groove, a signal (e.g., a sawtooth signal), is fed into an input port of an amplifier 25 so that the skipper bimorphs 21 are bent and the resulting relative motion established between stylus arm 4 and lifter/lowerer bimorph 19, laterally moves the stylus 5 allowing it to skip to another groove. Control over the polarity of the signal applied to skipper bimorph 21 establishes the direction in which the stylus moves (i.e., either towards inner convolutions or towards outward convolutions of the record). Means for generating such signals are disclosed in the above-mentioned U.S. Pat. No. 3,993,863.

Housing support 3 is open bottomed so as to permit stylus intrusion outside of the housing support. Bimorph elements 21 can be formed of two separate parts, as shown in FIG. 2, with both parts being in a plane which vertically intersects the plane in which the bottom of the housing support is defined.

What is claimed is:

1. A signal pickup apparatus comprising:
 (A) a casing having walls defining a protective enclosure and having an opening;
 (B) an elongated rigid element pivotally supported at one end thereof within said casing;
 (C) a signal pickup supported at the other end of said elongated rigid element; and
 (D) means for supporting said other end of said elongated rigid element within said casing in a manner permitting said signal pickup to protrude through said opening and for effecting movement of said other end of said elongated rigid element in two mutually perpendicular directions;
wherein said supporting means includes a pair of bimorph elements; one end of each of said pair of bimorph elements being attached to one end of a third bimorph element; said pair of bimorph elements being in a plane which is orthogonal to the plane which includes said third bimorph element; the other ends of said pair of bimorph elements being attached to said other end of said elongated rigid element; the other end of said third bimorph element being attached to one of said walls of said casing.

2. The apparatus defined in claim 1 wherein said pair of bimorph elements are attached to said elongated element so as to lie in a plane which is perpendicular to the plane in which said opening is defined.

3. A pickup apparatus for use with a disc record having a spiral information track disposed on the surface thereof; said apparatus comprising:
 (A) a cartridge body subject to radial translation toward the center of said record during playback;
 (B) a pickup arm;
 (C) a compliant support member for pivotally securing one end of said pickup arm to said cartridge body;
 (D) a signal pickup secured to the other end of said pickup arm; and
 (E) transducer means interposed between said other end of said pickup arm and said cartridge body for selectively effecting motion of said other end of said pickup arm toward-and-away from the plane of said record and toward-and-away from said record center upon energization thereof.

4. A pickup apparatus for use with a disc record having a spiral information track disposed on the surface thereof; said apparatus comprising:
 (A) a cartridge body subject to radial translation toward the center of said record during playback;
 (B) a pickup arm;
 (C) a compliant support member for pivotally securing one end of said pickup arm to said cartridge body;
 (d) a signal pickup secured to the other end of said pickup arm;
 (E) transducer means including a first bimorph element and a second bimorph element; one end of said first bimorph element being secured to said cartridge body; said second bimorph element being interposed between the other end of said first bimorph element and said other end of said pickup arm;

(F) means for selectively energizing said first bimorph element to effect motion of said other end of said pickup arm toward-and-away from the plane of said record; and (G) means for selectively energizing said second bimorph element to effect motion of said other end of said pickup arm toward-and-away from said record center.

5. A pickup apparatus for use with a disc record having a spiral information track disposed on the surface thereof; said apparatus comprising:

(A) a casing subject to radial translation toward the center of said record during playback;

(B) a pickup arm pivotally supported at one end thereof within said casing;

(C) a signal pickup secured to the other end of said pickup arm; and (D) transducer means including a pair of mutually perpendicular bimorph elements interposed between said other end of said pickup arm and said casing; the orientation of said mutually perpendicular bimorph elements being such that energization of one of said bimorph elements effects motion of said other end of said pickup arm toward-and-away from the plane of said record and energization of the other of said bimorph elements effects motion of said other end of said pickup arm toward-and-away from said record center.

* * * * *